Dec. 25, 1962   F. J. CARSON ET AL   3,069,878
METHOD AND APPARATUS FOR BENDING GLASS SHEETS
Filed Sept. 26, 1957   3 Sheets-Sheet 1
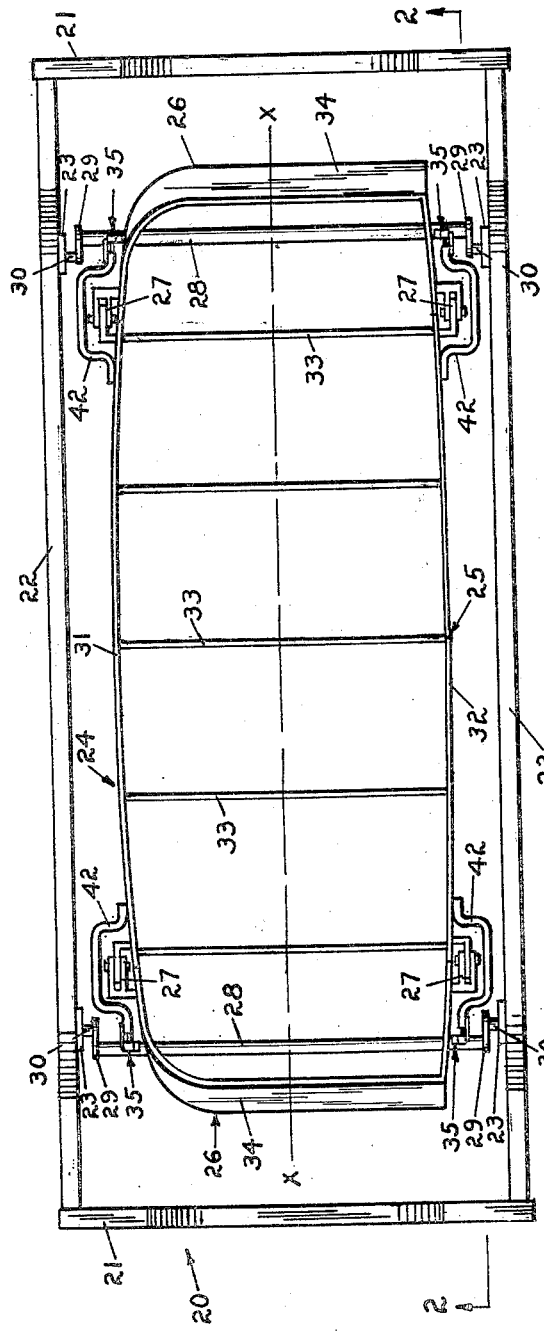
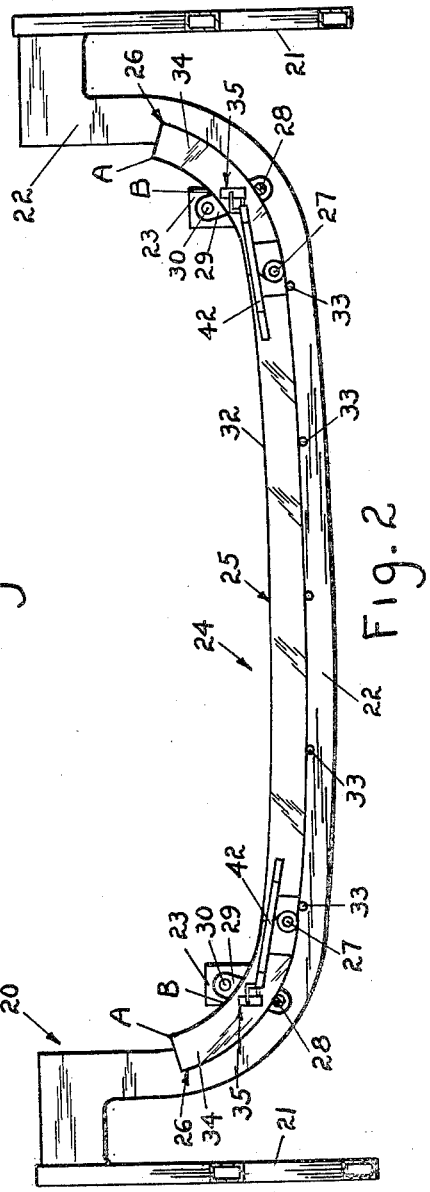
INVENTORS
Frank J. Carson and
BY   Alwin Stickel
Nobbe & Swope
ATTORNEYS

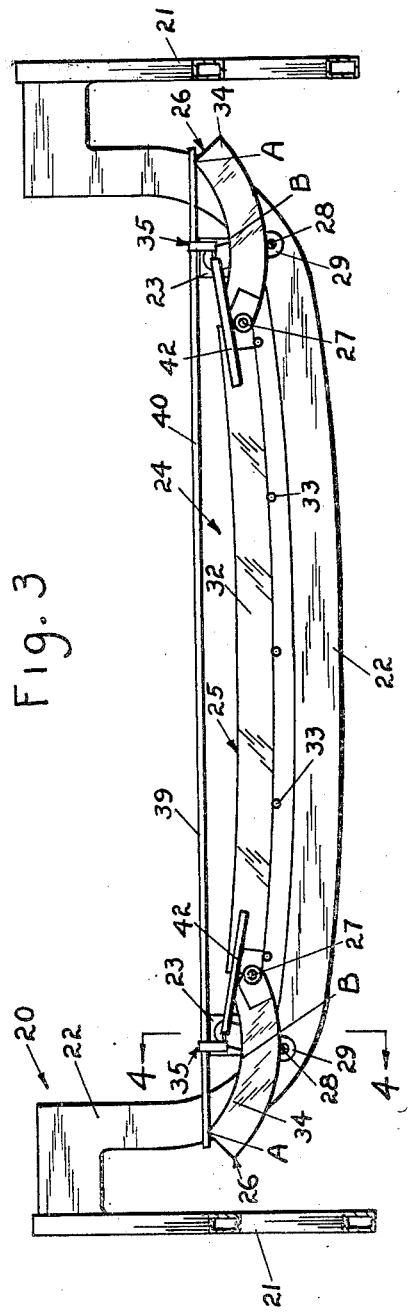

Dec. 25, 1962  F. J. CARSON ET AL  3,069,878
METHOD AND APPARATUS FOR BENDING GLASS SHEETS
Filed Sept. 26, 1957  3 Sheets-Sheet 3

INVENTORS
Frank J. Carson and
Alvin Stickel
BY
Nobbe & Swope
ATTORNEYS 3,069,878
METHOD AND APPARATUS FOR BENDING
GLASS SHEETS
Frank J. Carson and Ailwin Stickel, Toledo, Ohio, assignors to Libbey-Owens-Ford Glass Company, Toledo, Ohio, a corporation of Ohio
Filed Sept. 26, 1957, Ser. No. 686,453
5 Claims. (Cl. 65—107)

This invention relates generally to the bending or shaping of sheets of glass to a desired configuration, and more particularly to an improved method and apparatus for bending glass sheets to complex curvatures.

In the bending of glass sheets, particularly relatively long sheets, upon a bending mold of the multiple section type wherein one or more mold sections are movable, it is oftentimes desirable to support the glass sheet intermediate the ends thereof prior to the sheet being bent into contact with the mold shaping surface. The multiple section bending molds commonly used for forming symmetrical bends comprise a center section and oppositely disposed movable end sections which move from a spread apart position in the open mold position prior to bending a glass sheet to a closed position during the bending of the sheet. In the open position, the glass sheet is usually supported upon the outermost extremities of the mold and not supported intermediate its ends. However, when the sheet is of abnormal length it is very desirable to support the sheet intermediate its ends so that excessive sheet deflection will not take place. Also the intermediate sheet support tends to stabilize the sheet as it bends into contact with the mold center section and this is also true with respect to sheets of normal length which are also oftentimes bent upon multiple section molds having intermediate supports associated therewith.

Various types of intermediate sheet supports have been used in the past; perhaps the most efficient of these being of the type wherein arms having sheet engaging members carried thereby extend upwardly from the innermost ends of the movable mold end sections and support portions of the glass sheet intermediate the ends thereof which are to be bent into contact with the mold central section. Although intermediate sheet supports of this type have proven to be very effective for certain types of bends, it has been found desirable for other types of bends that the sheet be positively clamped during the action of the mold sections in moving from the open to the closed position. It has also been found desirable that the intermediate sheet supports be carried by the mold central section because the weight of the glass sheet upon the intermediate supports will facilitate the closing action of the mold.

The above desirable features are obtained in accordance with the method and apparatus of the present invention by providing, in combination with a multi-section mold, intermediate sheet supports carried by a central mold section and adapted to clampingly engage the longitudinal edge portions of the glass sheet to be bent as well as support the marginal surface portions of said sheet adjacent the points of clamping engagement.

It is therefore, an important object of the present invention to provide an improved method and apparatus for bending glass sheets to complex curvatures.

Another object of the invention is to provide an improved method and apparatus for bending a glass sheet in which longitudinal edges of the sheet are clamped against lateral movement of the sheet during bending.

Another object of the invention is to provide a multi-sectioned bending mold having improved sheet locating and support means carried by a central mold section.

A further object of the invention is to provide an improved method for bending a glass sheet into conformity with a multi-sectioned mold in which the sheet is simultaneously supported and positively retained in a predetermined position during the bending operation.

A further object of the invention is to provide a bending mold for bending a glass sheet having means associated therewith adapted to positively retain a glass sheet in the bending position relative to the mold by clamping the longitudinal edges of the sheet with a force which is proportional to the weight of the sheet and which automatically releases the sheet when positive retention is no longer required.

Other objects and advantages of the invention will become more apparent during the course of the following description when taken in connection with the accompanying drawings.

In the drawings, wherein like numerals are employed to designate like parts throughout the same:

FIG. 1 is a plan view of a multiple section bending mold constructed in accordance with the invention and shown in the closed position;

FIG. 2 is a longitudinal sectional view taken along the line 2—2 of FIG. 1;

FIG. 3 is a sectional elevation similar to FIG. 2 and showing the mold in the open position with a flat glass sheet mounted thereon;

FIG. 4 is a transverse sectional view taken along the line 4—4 of FIG. 3;

FIG. 5 is a transverse sectional view similar to FIG. 4 and showing the mold in the closed position;

Figure 6:
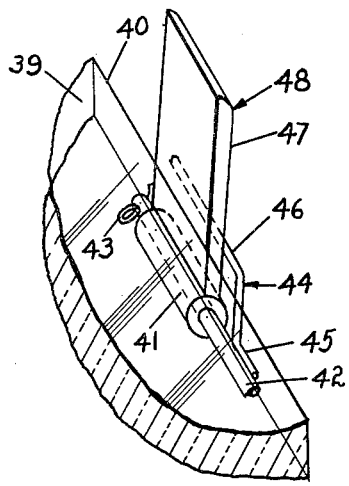
FIG. 6 is an enlarged view of a modified sheet engaging means.

Briefly stated, the present invention provides a novel method and apparatus for bending a glass sheet to complex curvature which includes a multi-sectioned bending mold having a central section and oppositely disposed movable end sections in combination with improved sheet engaging means carried by the mold central section and adapted to support the glass sheet to be bent as well as to positively prevent the sheet from shifting during the bending cycle by clamping the longitudinal sheet edges while the mold is moving from the open to the closed position. The clamping force exerted on the sheet edges is controlled by the weight of the sheet so that it is at a maximum prior to the bending of the sheet and at a minimum or non-existent prior to all portions of the sheet being bent into conformity with the mold shaping surface. By locating the improved sheet engaging means upon the mold central section, the mold end sections rotate with less difficulty and upon contacting the portion of the glass sheet supported and clamped by the sheet engaging means the clamping force is released thus leaving the sheet free to finally conform to all portions of the mold shaping surface.

With reference now to the drawings and particularly FIGS. 1 to 3, the numeral 20 designates in its entirety a mold supporting frame. This frame comprises a pair of spaced upwardly extending end members 21 which are connected to one another at their uppermost ends by a pair of concavely curved U-shaped mold supports 22. To support the mold which will be later described in detail, a pair of brackets 23 are rigidly secured to the inside vertical face of each of the supports 22 toward the bottom thereof and extend a limited distance above the supports in a vertical plane.

The mold proper is generally indicated by the numeral 24 and comprises a plurality of cooperatively connected mold shaping rail sections including a center section 25 and two oppositely disposed aligned U-shaped end sections 26. The center section 25 is movably connected to each of the oppositely disposed end sections 26 by means of the commonly used hinges 27 so that, in the closed mold position of FIG. 2, there is formed a continuous shaping surface of the desired contour for the bent glass sheet. To support the mold for movement from the open position of FIG. 3 to the closed position of FIG. 2, a transversely extending support rod 28 is rigidly secured to each of the mold end sections and has its opposite ends rotatably supported by a link 29 which, in turn, is pivoted about a pin 30 which is fixedly mounted in a bracket 23. The support rods 28 are so positioned that the mold will close due to the weight of the center section unless a force is applied to the outermost portions A of the oppositely disposed end sections.

The center section 25 of the mold includes a pair of concavely curved shaping rails 31 and 32 which rise from the center in an arc that terminates at the pivot point of each hinge 27. Tie rods 33 span the space between the shaping rails 31 and 32 and are secured to the underside thereof thus rigidly maintaining the relative positions of the two rails.

Each end section 26 comprises a U-shaped shaping rail 34. As stated above, the shaping rails 34 are secured to and carried by the transverse rods 28 and are movably connected to the shaping rails 31 and 32 by means of the hinges 27.

The novel sheet engaging means of the invention comprises L-shaped locator support members generally indicated by the numeral 35 mounted in pairs along each side of the center section 25 and spaced outwardly from each of the shaping rails 31 and 32 adjacent the ends thereof. As shown in the open mold position of FIG. 3, the members 35 extend outwardly of the ends of the mold center section and engage portions of the glass sheet which are also engaged by the mold end sections 26.

Figure 7:
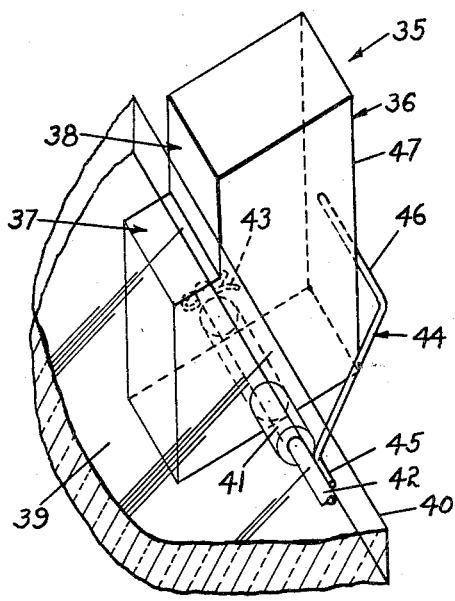
FIG. 7 is an enlarged view of the preferred sheet engaging means.

As shown in FIG. 7, each member 35 comprises an L-shaped block 36 of suitable refractory material which will not fuse with the glass at the bending temperature. Each of the blocks 36 comprises a bearing surface 37 and a retaining surface 38 which intersect one another at substantially right angles. In the sheet supporting position of FIGS. 7 and 9, the bearing surface 37 is disposed in a substantially horizontal plane and engages a portion of the undersurface of a glass sheet 39 to be bent while the retaining surface 38 is disposed in a substantially vertical plane and clampingly engages an adjacent portion of the longitudinal edge 40 of the sheet 39.

It was previously brought out that the retaining or clamping force exerted by the novel sheet engaging means of the present invention is proportional to the weight of the sheet and that the clamping force is released prior to the sheet settling into complete conformity with the mold shaping surface. To carry out this function, each of the members 35 is mounted over the mold end sections, in the open mold position, for limited free rotational movement in a substantially vertical plane about an axis substantially parallel to the longitudinal mold axis x—x as well as the longitudinal edge 40 of the glass sheet 39.

As shown in FIG. 7, each of the blocks 36 is provided with a rigidly secured bearing 41 extending transversely therethrough and having its axis located inwardly of the center of gravity of the block and substantially parallel to both the bearing and retaining surfaces thereof.

The block 36 is rotatably mounted for movement in a substantially vertical plane upon a U-shaped support rod 42 having its innermost end rigidly secured to one of the respective center section shaping rails 31 or 32 and provided at its outermost end with a cotter key 43 which limits outward sliding movement of the block 36.

Figure 8:
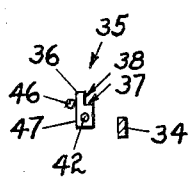
FIG. 8 is a diagrammatic transverse sectional view of the mold in the open position before receiving the glass sheet.
Figure 11:
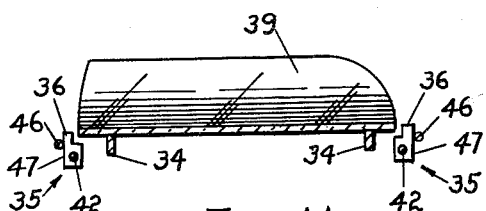
FIG. 11 is a view similar to FIG. 8 and showing the mold in the closed position at the end of the bending cycle before the glass sheet is removed.

Since the bearing 41 is located inwardly of the center of gravity of the block 36 and is freely rotatable upon the support rod 42, the block has a tendency to rotate outwardly. To limit this outwardly rotational movement and locate the block in the sheet receiving position of FIG. 8, a Z-shaped stop rod 44 is provided and has its innermost leg 45 rigidly secured to the support rod 42 immediately inwardly of the bearing 41, thus limiting inward movement thereof, and its outermost leg 46 spaced from the support rod 42 a distance so that the retaining surface 37 of the block 36 is maintained substantially horizontal and in sheet receiving position by engagement of the outermost block surface 47 with the rod 44. As will be later more fully described, the supporting of a glass sheet upon the bearing surface 37 of the block 36 causes the block to rotate inwardly about the rod 42 thus bringing the retaining surface into clamping engagement with the longitudinal sheet edge 40.

Since the members 35 are disposed opposite one another on both sides of the mold, opposed blocks 36 simultaneously engage the glass sheet and thus provide opposed clamping forces which are substantially equal and directly proportional to the weight of the sheet since the sheet weight provides the rotation force necessary to bring the retaining surfaces 38 into engagment with the longitudinal sheet edges 40.

In accordance with the method of the invention and prior to actual bending of the sheet, the mold is moved to the open position of FIG. 3 by rotating the mold end sections 26 about the rods 28 which elevates the central section 25 and lowers the outermost ends A of the end sections. In this position, the locator supports 35 are disposed above the mold end sections 26 and immediately above the portions B of the end section rails 34 and the bearing surfaces 37 of each of the blocks 36 is located in a common substantially horizontal plane which also contains the outermost portions of the end section rails 34. Due to the off-set mass of the L-shaped blocks 36, the outermost block surfaces 47 are located in engagement with the stop rods 44 and in the sheet receiving position of FIG. 8.

Figure 9:
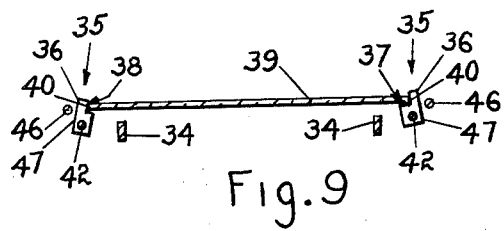
FIG. 9 is a view similar to FIG. 8 and showing the mold in its open position after the glass sheet has been placed on the sheet engaging means.
Figure 12:
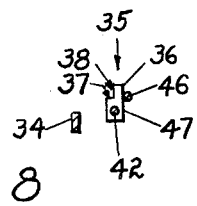
FIG. 12 is a view similar to FIG. 8 and showing the mold in the closed position after the glass sheet has been removed.
Figure 10:
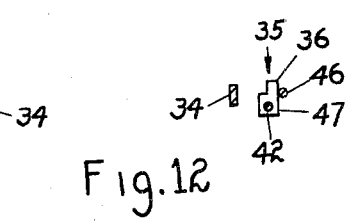
FIG. 10 is a view similar to FIG. 8 and showing the mold in a position during the bending cycle intermediate the open and closed position.

The glass sheet 39 is then placed upon the locator supports 35 as shown in FIGS. 3 and 9 and the sheet is thus supported in a given plane above the mold 24 by the bearing surfaces 37 upon which rest marginal surface portions of the sheet 39, as well as the outermost ends of the mold end sections. The lateral position of the glass sheet relative to the mold 24 is determined by the fixed location of the retaining surfaces 38 of the blocks 36 and, as previously set forth, the weight of the sheet causes the retaining surfaces to be rotated into clamping engagement with the longitudinal sheet edges 40 with the magnitude of the clamping force being proportional to the weight of the sheet.

With the glass sheet 39 thus supported and retained, the mold 24 is passed into and through a suitable bending furnace (not shown) wherein the glass sheet 39 is progressively heated until it reaches bending temperature and begins to sag toward the mold shaping surface. At this time, the mold end sections 26 begin to rotate upwardly and inwardly about the transverse support rods 28, and the glass sheet 39 is initially bent between its points of contact A with the outermost ends of the mold end section 26 and the points of clamping engagement and support adjacent the locator supports 35. As the mold 24 continues its closing movement, the portion B of the end section shaping surface 34 gradually approaches the bearing surfaces 37 of the respective locator supports 35, and immediately prior to the mold moving to the full closed position the last increment of mold closing action rotates the shaping surface portion B into and above the plane defined by the bearing surfaces 37 thus lifting the glass sheet 39 free of contact with the blocks 36. At this time, the locator supports rotate to their open position and no longer clamp the sheet edges 40. Depending upon the exact type of bend to be formed, the clamping force exerted by the locator supports 35 may be progressively decreased prior to the sheet being released by varying the location of the support points of the respective mold end sections upon the transverse rods 28. When the transverse rods 28 are located as shown in FIGS. 1 to 3, the center of the glass sheet 39 through proper furnace heat control will contact the rails 31 and 32 substantially simultaneously with or immediately after the portions B of the mold end section shaping surface 34 being rotated into the plane of sheet support as defined by the bearing surfaces 37 of the blocks 36 and thus the clamping force will remain substantially constant during the closing action of the mold.

In some instances it is desirable that the clamping force be progressively decreased immediately prior to all portions of the glass sheet contacting the mold. This may be accomplished by locating the transverse rods 28 inwardly of their positions as shown in FIGS. 2 and 3 which will cause the center of the sheet 39 to sag into contact with the rails 31 and 32 prior to the portions B of the mold end section shaping rails passing through the sheet support plane defined by the bearing surfaces 37. During further closing action of the mold 24, the areas of contact with the rails 31 and 32 are progressively increased and, in turn, the rails support a greater proportion of the weight of the sheet. This correspondingly leaves a lesser amount of weight to be supported by the locator supports 35 which, in turn, further decreases the clamping force applied to the longitudinal edge portion 40 of the sheet. Immediately preceding the mold closing, at which time the major portion of the glass sheet 39 corresponds to the mold center section shaping rails 31 and 32 and is supported on the center section rails 31 and 32, the clamping force is at a minimum. The final mold closing action again displaces the portions B of the end section shaping rails 34 above the plane of the bearing surface 37 thus completely freeing the glass sheet 39 which then is not influenced by external forces and is able to properly and finally conform to all portions of the mold sections.

Regardless of whether or not the clamping force remains constant, the basic features of the method of the invention remain the same and comprise initially supporting the sheet in a given plane while supporting the undersurface thereof intermediate the ends and clampingly engaging the opposed longitudinal sheet edges. After the sheet is softened by heat the opposite ends thereof are rotated upwardly until the supported and clamped sheet portions are completely released by the upward movement of the mold end sections after which the sheet settles into final conformity with the mold.

A modification of the improved locator support constructed in accordance with this invention is shown in FIG. 6. With the exception of a retainer plate 48, all parts of this modified locator support are identical with those of the L-shaped locator support plate 35 previously described. Thus, in the interest of clarity, these parts have been assigned identical reference numerals to those corresponding to the parts of FIG. 7.

With reference to the novel locator support of a modified form of FIG. 6, a retainer plate 48 replaces the L-shaped block 36 shown in FIG. 7. The retainer plate 48 is rigidly secured to the bearing 41 in a plane offset outwardly from the center line of the bearing. Thus, the retainer plate 48 will tend to rotate about the axis of the bearing 41 because of the unbalanced offset mass, but such rotation is limited by the stop rod 44. As the glass sheet 39 is placed on this modified locator support when the mold is in its open position, the weight of the glass sheet 39 is supported directly by the bearing 41 along a marginal portion of the undersurface thereof. This weight acts upon the bearing 41 in a plane which is offset from the center line of the bearing on the opposite side of the bearing 41 from the plane of the retainer plate 48. Thus, the greater mass of the glass sheet 39 causes the bearing 41 and the attached retainer plate 48 to rotate in an opposite direction from the normal rotation of the retainer plate 48 and this rotation continues until the retainer plate 48 rotates into clamping contact with the longitudinal edge 40 of the glass plate 39. Inasmuch as retainer plates 48 contact both longitudinal edges 40 of the glass plate 39 simultaneously, the glass is positively located in a predetermined position established by the position of the bearings 41 and the retainer plates 50.

It is to be understood that the forms of the invention disclosed herein are to be taken as the preferred embodiments thereof and that various changes may be resorted to without departing from the spirit of the invention or the scope of the subjoined claims.

We claim:

1. In a method of bending a glass sheet into conformity with the shaping surface of a mold by supporting the sheet above the mold and heating said sheet until it softens and sags into conformity with the mold, the steps of applying opposed forces of a magnitude proportional to the weight of the sheet to opposed longitudinal edges of the sheet while the sheet is being heated to clamp the sheet laterally with respect to the mold, rotating opposed ends of the sheet upwardly while maintaining the application of the opposed forces, and discontinuing the application of the opposed forces prior to full contact of the sheet with the mold.

2. In a method of bending a glass sheet as defined in claim 1, wherein the magnitude of the opposed forces is progressively decreased prior to discontinuing the application of said forces.

3. In apparatus for bending a flat glass sheet, a bending mold comprising a plurality of mold sections disposed end to end along the longitudinal axis of the mold and including movable end sections and an intermediate section pivotally joined together at their adjacent ends, a plurality of L-shaped support elements mounted on said intermediate section and each having a substantially vertical leg and a substantially horizontal leg disposed in a plane extending perpendicularly to said axis, means pivotally mounting each of said support elements on said intermediate section to turn in said plane about a second axis parallel to said longitudinal axis, support surfaces formed on the substantially horizontal legs of said support elements to engage the underside of said sheet and support the latter on said mold, sheet locating surfaces formed on the substantially vertical legs of said support elements and adapted to engage the longitudinal edges of said sheet, each of said support elements being urged to rotate about said second axis in response to the weight of said sheet on said support surfaces whereby said locating surfaces are caused to exert an inwardly directed force on opposite longitudinal sheet edges proportional to the weight of said sheet, means supporting said movable end sections of said mold for movement between an open position below said support elements and a closed position above said elements whereby upon moving to said closed position the end sections lift the sheet from said support surfaces whereby the locating surfaces will move outwardly to thereby remove said inwardly directed forces from said sheet edges.

4. In apparatus for bending a flat glass sheet as claimed in claim 3, including stop means carried by the means mounting said support elements on said intermediate section to limit the outward movement of said locating surfaces.

5. In apparatus for bending a flat glass sheet as claimed in claim 3, in which the intermediate mold section includes spaced longitudinal shaping rails, and in which the means mounting said support elements on said intermediate section are carried by said shaping rails.

References Cited in the file of this patent

UNITED STATES PATENTS

| | | |
|---|---|---|
| 2,111,392 | Galey | Mar. 15, 1938 |
| 2,518,951 | Smith | Aug. 15, 1950 |
| 2,551,606 | Jendrisak | May 8, 1951 |
| 2,554,572 | Jendrisak | May 29, 1951 |
| 2,737,758 | Jendrisak | Mar. 13, 1956 |
| 2,744,359 | Jendrisak | May 8, 1956 |
| 2,774,189 | Jendrisak | Dec. 18, 1956 |
| 2,814,164 | Carson et al. | Nov. 26, 1957 |
| 2,872,756 | Jendrisak | Feb. 10, 1959 |